United States Patent [19]

Berrebi et al.

[11] Patent Number: 4,977,117
[45] Date of Patent: Dec. 11, 1990

[54] PROCESS OF PRESULFURIZING AND CONTROLLING THE ACTIVITY OF CATALYST FOR TREATING HYDROCARBONS

[75] Inventors: Georges Berrebi, Bourg Les Valence; Pierre Dufresne, Rueil Malmaison, both of France

[73] Assignee: Europeenne De Retraitement De Catalyseurs, La Voulte Sur Rhone, France

[21] Appl. No.: 330,255

[22] Filed: Mar. 29, 1989

[30] Foreign Application Priority Data

Mar. 29, 1988 [FR] France ................ 88 04253

[51] Int. Cl.$^5$ .................. B01J 23/94; B01J 23/92; B01J 37/20; C10G 45/08
[52] U.S. Cl. .................... 502/26; 208/216 R; 502/31; 502/54; 502/164; 502/167; 502/168; 502/200; 502/219; 502/220; 502/222
[58] Field of Search ........... 502/22, 26, 31, 51, 502/54, 55, 221, 220, 219, 222, 223, 200, 167, 164

[56] References Cited

U.S. PATENT DOCUMENTS

| | | | |
|---|---|---|---|
| 4,031,031 | 6/1977 | Yamaguchi et al. | 502/26 |
| 4,048,058 | 9/1977 | Petersen et al. | 502/223 |
| 4,155,875 | 5/1979 | Yamaguchi et al. | 502/26 |
| 4,530,917 | 6/1985 | Berrebi | 502/220 |
| 4,719,195 | 1/1988 | Toulhoat et al. | 502/216 |
| 4,725,569 | 2/1988 | Tuszynski et al. | 502/220 |
| 4,725,571 | 2/1988 | Tuszynski | 502/220 |
| 4,740,491 | 4/1988 | Wise et al. | 502/220 |

*Primary Examiner*—Paul E. Konopka
*Attorney, Agent, or Firm*—Millen, White & Zelano

[57] ABSTRACT

The invention involves a process comprising regenerating a catalyst comprising (a) a support containing at least one oxide of a metal or metalloid and (b) at least one active metal, said process comprising in a first stage treating said catalyst in the absence of hydrogen with at least one sulfurizing agent comprising a polysulfide of the formula

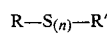

wherein n is 2 to 20, R is an organic radical of 1-150 carbon atoms per molecule and R' is independently a radical as defined for R or a hydrogen atom, whereby said agent is incorporated at least in part in said catalyst, in a first portion of a second stage, treating the catalyst in the absence of hydrogen and in the presence of steam, moist air or moist inert gas, at a temperature up to 275° C., and, in a second portion of the second stage, treating the catalyst in the presence of hydrogen at a temperature of at least 275° C., wherein in the first stage a nitrogen compound is added.

15 Claims, No Drawings

PROCESS OF PRESULFURIZING AND CONTROLLING THE ACTIVITY OF CATALYST FOR TREATING HYDROCARBONS

This invention relates to a process of presulfurizing a catalyst for treating hydrocarbons and/or preconditioning a catalyst then to be presulfurized. The invention makes an improvement in the European patents of the applicant EP-B No. 130850 and EP-B No. 181254 which will be referred to for illustration of the art.

BACKGROUND OF THE INVENTION

It will be recalled briefly that often the sulfurizing agent used in the prior art is either pure hydrogen sulfide or hydrogen sulfide diluted with hydrogen or gaseous hydrocarbons, or also dimethyl disulfide diluted with hydrogen, or other sulfur compounds such as alkyl sulfides or alkyl mercaptans, diluted with hydrogen (see U.S. Pat. No. 4,172,027).

The catalyst metals used in refining, hydrorefining or in petrochemistry, whether they be new or regenerated, are most often in oxidized form, at times in metal form (for some metals of reforming catalysts in particular). The metals of these catalysts, often being active only in sulfurized or at least partially sulfurized form, necessitate therefore that the refiner or the petrochemist perform a sulfurizing of the catalyst prior to its use.

Regeneration of the catalysts is now increasingly performed by a specialist in the regeneration of catalysts, at times far from the industrial unit. It is preferable to restore to the refiner a product ready for use, which was made possible by the efficient processes of European patents EP.A. Nos. 130850 and 181254 in which a sulfur compound is incorporated in the catalytic compound, said compound, causes the sulfurizing or the presulfurizing of the catalyst when, subsequently, in the reaction zone (zone for treating the charge) or in the immediate proximity of the reaction zone, the catalyst will be put in contact with hydrogen.

More precisely, in European patent EP.B. No. 130850, the sulfurizing process of the catalyst is characterized by a preliminary stage called incorporation in the catalytic compound of a sulfur compound of a specific nature.

The preliminary stage of introduction of a sulfur compound, that arbitrarily is called "off site" or "ex situ," whether it be performed close to the site of the industrial unit or at a more or less geographically great distance from the industrial unit (where the catalyst has been regenerated or where it was manufactured, for example) in any case, is no longer done in the immediate vicinity of the reactor (arbitrarily written in situ), i.e. at the head of the reactors or in the zones more or less directly connected to these reactors, necessitating operation under operating conditions, (temperature, pressure or others), imposed at least in part by the operating conditions of the reactors themselves or the accessories of these reactors (preliminary hydrogenation zone of the catalyst, for example).

The process of EP.B. No. 181254 makes it possible, when the catalyst is subjected from its start preferably on site ("in situ") to the standard activation reaction in the presence of hydrogen, (generally above 100° C.), to initiate, then thanks to the presence of hydrogen on site, sulfurizing—at the rate required, stoichiometric or not stoichiometric—one or more active metals entering the composition of the catalyst. The process involves incorporating, in a first stage in the absence of hydrogen, in the porosity of the new or regenerated catalyst at least one sulfurizing agent, the sulfurizing agent being a polysulfide of the general formula:

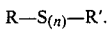

$$R-S_{(n)}-R'.$$

Said sulfurizing agent is used in solution in a solvent.

In the second stage, performed "in situ," and preferably above 150° C., an activation stage of the catalyst performed in the presence of hydrogen is initiated, the amount of sulfur required being fixed, thanks to the presence of hydrogen, on the metal or metals entering the composition of said catalyst.

In the polysulfide of the formula:

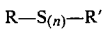

$$R-S_{(n)}-R'$$

n is a whole number from 3 to 20, preferably from 4 to 8 and more particularly from 5 to 7; R and R', identical or different, represent organic radicals each containing 1 to 150 carbon atoms per molecule, preferably either 10 to 60 carbon atoms or 5 to 40 carbon atoms and more particularly 7 to 16, these radicals being chosen from the group consisting of alkyl radicals, i.e. saturated or unsaturated, straight or branched or of naphthenic type, aryl radicals, alkylaryl radicals and arylalkyl radicals, these various radicals being able to comprise at least one heteroatom. R' optionally also can be a hydrogen atom.

As a preferred example of polysulfide, the ditertiododecyl polysulfide (n=5) where R and R' are each a dodecyl radical can be cited.

This product is marketed for example by ELF AQUITAINE under the name TPS 32, particularly because it contains about 32% by weight of sulfur.

Ditertiononyl polysulfide (n=5) where R and R' are each a tertiononyl radical also can be cited.

This product is marketed by ELF AQUITAINE under the name TPS 37, particularly because it contains about 37% by weight of sulfur or by PENNWALT under the name TNPS.

For reasons of procedure, these sulfurizing agents of polysulfide type obviously can be used alone or in a mixture of them in proportions chosen judiciously.

The first stage mentioned above is performed in the absence of hydrogen and makes it possible to obtain with very great precision the degree of total or partial sulfurizing requested by the user. This incorporation of sulfur is performed between 0° and 50° C. and preferably between 10° and 35° C. and preferably also at room temperature.

The sulfurizing agent is used, diluted in a suitable solvent which depends particularly on the nature of the sulfurizing agent, i.e. on R and R', radicals which determine the content of sulfur incorporated in the catalyst generally by capillary action or by porosity. The sulfurizing processes actually vary according to the cuts to be processed subsequently in the presence of catalysts treated according to the invention.

At the end of this first stage, a second stage is initiated which is divided into two parts:

The first part of this second stage is performed in situ or ex situ. The first part of the second stage is performed in the absence of hydrogen. It is performed in the presence of air or an inert gas. According to a preferred method, it is performed in the presence of at least steam or at least moist air or a moist inert gas during at least about 5 minutes, "in situ" or "ex situ" at a temperature between about 65° and 275° C. under a pressure between about 0.5 and 70 bars (0.05 and 7 MPa), the catalyst then being dried.

Preferably, the operation can take place for at least 5 minutes and preferably at most 10 hours between 65° and 265° C., under a pressure between 0.5 and 70 bars (0.05 and 7 MPa), preferably between 85° and 260° C. and more particularly between 95° and 150° C.

When working in the presence of steam, the latter should be superheated to at least 110° C.

When operating in the presence of moist inert gas or moist air, it is advisable to operate with a relative humidity on the order of 2 to 60% by volume at the drying stage, and at a temperature between 105° and 200° C., preferably between 110° and 170° C. A gas can also be used whose water content is between 50 and 100% (pure steam), preferably between 90 and 100%, and operated between 5 minutes and 10 hours under 0.05 to 7 MPa at a temperature lower than 200° C., preferably lower than 170°.

Subsequently, on site or in the proximity of the site (on which the catalyst will be used for the processing of various charges), at the time of the standard activation reaction, performed in the presence of hydrogen (second stage of the process of European patent application EP.B. No. 181254), the sulfurizing agent introduced in the catalyst in predetermined amounts, will be able to produce hydrogen sulfide which, in the presence of hydrogen, will lead to the desired sulfide or sulfides of the metal or metals present in the catalyst.

During the second stage, the catalyst is brought to a temperature equal to at least 275° C., for at least 1 minute.

The second part of the second stage generally is performed in situ and therefore can merge with the starting or the running itself of the refining and petrochemical reaction for which the catalyst prepared according to this invention is designed, in the case precisely where such a reaction is performed above 275° C.

When the temperature chosen for the refining or petrochemical reaction is lower than 275° C. (for example, this can be the case of hydrodesulfurizing gasolines or kerosenes), it is sufficient then to lower the temperature used for activation of the catalyst in the second part of the second stage after this stage to the temperature appropriate for the refining or petrochemical reaction.

It has been found that in the first part of the second stage, despite the absence of hydrogen, the catalyst sulfurizes, i.e., the oxides of active metals of the catalyst are converted into sulfides. This phenomenon is observed easily by analysis of the catalyst, which furthermore becomes black. On the other hand, chemisorption tests show that as long as the catalyst does not reach the temperature of 275° C. and does not remain several minutes at, at least 275° C., this catalyst remains without catalytic activity.

SUMMARY OF THE INVENTION

The invention is an improvement of the methods mentioned above.

The invention relates to a two-stage process of treating a new or regenerated catalyst containing (a) a support with a base of at least one oxide of a metal or a metalloid and (b) at least one active metal, a process in which, in a first stage performed preferably "ex situ," preferably between about 0° and 50° C. and in the absence of hydrogen, the catalyst is treated with at least one sulfurizing agent to incorporate this agent partially or totally in the porosity of the catalyst, the sulfurizing agent being a polysulfide of the general formula:

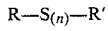

where n is a whole number from 2 to 20 and where R' represents a hydrogen atom or another radical identical or different from radical R, these two radicals thus each representing an organic radical containing 1 to 150 carbon atoms per molecule, these radicals being chosen from the group consisting of alkyl radicals, i.e., saturated or unsaturated, straight or branched or of naphthenic type, aryl radicals, alkylaryl radicals and arylalkyl radicals. Said sulfurizing agent is used in solution in a solvent, the catalyst then optionally being dried. In a second stage, the catalyst obtained in the first stage is treated in the absence of hydrogen and in the presence of at least steam or at least one moist inert gas or moist air preferably for at least about 5 minutes, "in situ" or "ex situ," preferably at a temperature between 65° and 275° C., preferably under a pressure between about 0.5 and 70 bars (0.05 and 7 MPa), the catalyst at this stage optionally being dried before its use in refining. Particularly, the process is characterized in that during the first stage, an addition by weight of about 0.1 to 10% of at least one nitrogen compound, a weight expressed in nitrogen, is made, in relation to the weight of the polysulfide or polysulfides. Thus, as an example, an additive on the order of 0.1 to 20% can be incorporated in the catalyst.

The invention is particularly well suited for catalysts for cracking and hydrocracking hydrocarbons and more generally for the reactions of conversion of hydrocarbons and for the refining operations.

In this invention, the first stage of the process of treatment of the catalyst, i.e., the "ex situ" incorporation of the polysulfide in the porosity of the catalyst, is performed in the presence of at least one additive which is an organic or inorganic nitrogen compound able to supply ammonia which under the conditions of the first stage and the first part of the second stage will be deposited at least partially on the catalyst. Actually, it has been found that ammonia thus deposited on the catalyst will limit the activity of the catalyst, i.e., will passivate this catalyst.

Subsequently, when the catalyst is put in contact with the hydrogen in the refining or petrochemistry process, the ammonia will desorb and the catalyst then will regain all its activity. The process according to the invention thus makes possible a better controlling of the entire process of pretreatment of the catalyst and even a slight improvement of the activity of the catalyst. The process according to the invention supposes that the first part of the first stage is performed in the presence of at least steam or at least a moist inert gas, particularly moist air.

Further, according to the invention, in the second stage (a) either steam, (b) or moist air, (c) or a mixture of steam or moist air and a gas which is inert or not, can be used.

The operation takes place for at least 5 minutes and preferably at most 10 hours between 65° and 265° C., under a pressure between 0.5 and 70 bars (0.05 and 7 MPa), preferably between 85° and 260° C. and more particularly between 95° and 150° C.

When working in the presence of steam, the latter should preferably be superheated to at least 110° C.

When operating in the presence of moist inert gas or moist air, it is advisable to operate with a relative humidity on the order of 2 to 60% by volume at the drying stage, and at a temperature between 105° and 200° C., preferably between 110° and 170° C. A gas can also be used whose water content is between 50 and 100% (pure steam), preferably between 90 and 100%, and operated between 5 minutes and 10 hours under 0.05 to 7 MPa at a temperature lower than 200° C., preferably lower than 170° C.

Briefly, during the first part of the second stage, the oxides of the active metals are converted into sulfides, the catalytic activity of these sulfides appearing only when the catalyst reaches about 275° C., in the presence of hydrogen (second part of the second stage).

In this invention, it therefore was found that it was advantageous, during the first stage, to operate in the presence of at least one nitrogen compound. This nitrogen compound is chosen preferably from the group consisting of organic or inorganic ammoniated compounds, quaternary ammonium compounds, ammonia and its derivatives, nitrites, ammonium nitrile compounds, nitro derivatives, nitrous and nitroso compounds, aromatic nitro compounds such as nitrobenzene, primary, secondary and tertiary amines, diamines and polyamines, said amines being alkyl amines, arylamines and alkylarylamines or arylalkylamines, for example, trimethylphenylammonium derivatives will be cited. Among the arylamines there can be cited aniline, methylaniline, dimethylaniline, diphenylamine, triphenylamine.

Ortho-, meta- or para-toluidines, naphthylamines (particularly alpha- or beta-naphthylamine), diazo and azo compounds, hydrazo compounds, phenylhydrazines can also be used. Aliphatic and aromatic polyamines, diamine benzene derivatives (phenylene diamines), benzidine, etc., amides substituted or not, double substituted with nitrogen (diacyl amides and triacyl amides), amidines, nitriles, urethanes, urea, substituted ureas, aminoureas (semicarbazides), amidinothiourea, thioureas, guanidines, cyanamides, nitro phenols, aminoalcohols, aminophenols, amino acids, heterocyclic nitrogen compounds, for example, pyrroles and their homologs, pyrrolines and their homologs, pyrrolidines and their homologs, polypyrroles, dipyrrolmethanes, porphyrins, indoles or benzopyrroles, hydroxyindoles or ketoindolines, polyindole compounds, compounds of the isoindole group, carbazole (dibenzpyrrole), piperidine and its compounds, pyridine and its compounds such as alkyl pyridines (picoline, lutidine, etc.), pyridones, piperidine and derivatives, polypyridine (quinoline and derivatives, quinaldine, quinolinic acid and its homologs, acridines, isoquinoline, pyrazoles and derivatives (pyrazolines, pyrazolones), glyoxalines or imidazoles, furazans, triazoles, 3-amino 5-mercapto 1,2,4-triazole, benzotriazoles (or azimide), tetrazole, diazines, particularly ortho-, para- and meta-pyridazines, pyridazine, pyrimidines (including uracil), pyrazines, piperazines, diketopiperazines, triazines, particularly cyanuric acid and tetrazines, 2,5-diamercapto 1,3,4-thiadiazole, compounds with the pyrimidine ring condensed to the imidazole ring (uric acid for example), amino alkaloids, etc. and in a general way all the nitrogen compounds able to supply ammonia, can be used also.

Advantageously 0.1 to 10% by weight of the nitrogen compound, weight expressed in nitrogen, preferably 0.2 to 5% and more particularly 0.9 to 1.2% of the nitrogen compound or compounds chosen, will be used, in relation to the weight of the polysulfide or polysulfides used.

The additive or additives can be added, for example, with the solution of the polysulfide or polysulfides used, either in the pure state, or dissolved in a suitable solvent. This solvent can be of the same type as the solvent chosen to dissolve the polysulfide, namely, for example:

a light gasoline boiling for example between about 60° to 95° C., a hexane type gasoline boiling between about 63° and 68° C., an F type gasoline boiling between about 100° and 160° C. and generally containing 10 to 20% aromatic hydrocarbons, for example 15% (by volume), a "mineral spirits" type gasoline boiling between about 150° and 250° C. and generally containing 14 to 22% aromatic hydrocarbons, for example 17%, by volume, any cut, hydrocarbon or not, equivalent to the preceding gasolines.

The nitrogen compound or compounds according to the invention, can be used in another suitable solvent such as, for example, water, alcohols (methanol, ethanol, propanol, etc.) or other inorganic or organic liquids known for dissolving the nitrogen compounds chosen.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, unless otherwise indicated, all parts and percentages are by weight.

The entire texts of all applications, patents and publications, if any, cited above and below, and of corresponding application No. 88/04.253 filed Mar. 29, 1988 in France, are hereby incorporated by reference.

EXAMPLES

In the following examples, the impact of the adopted method of regeneration of the catalyst will be studied for a hydrorefining of a hydrocarbon cut.

The cut that proposed to be hydrorefined is a model charge containing by weight:

20% toluene

2% thiophene

78% cyclohexane

The operating conditions are the following:

temperature: 350° C.

Total pressure: 60 bars (6 MPa)

VVH (space velocity): 2 liters charge/liter catalyst/hour

H2/HC (hydrogen/hydrocarbons): 350 l/h

Period of treatment: 48 hours

Volume of the catalyst used: 40 cc in the 3 examples 1 to 3 to determine the method giving the best performance.

Analysis of the effluents is performed by chromatography in the gas phase. In each test, the activity in hydrogenation ("A") of the toluene and the activity in isomerization ("I") of the cyclohexane in methylcyclopentane will be measured:

$$A = \text{Log} \frac{1}{1-x}$$

(Napierian logarithm) where X is the conversion rate of the toluene, i.e.

$$X = \Sigma P / \Sigma T$$

ΣP representing the sum of the molar titers of the conversion products of the toluene (methylcyclohexane, ethylcyclopentane and dimethylcyclopentanes) and ΣT representing the sum ΣP+residual toluene titer.

X is between 0 and 1, X being equal to 1 for a 100% conversion of toluene.

$$I = 100 \times \frac{\text{Molar titer of methylcyclopentane}}{(\text{Molar titer in methylcyclopentane} + \text{molar titer in residual cyclohexane})}$$

(the activity in isomerization I makes it possible to measure the acidity of the catalyst).

The catalyst used is a commercial catalyst of the Procatalyse company HR 346, containing by weight 3% of nickel oxide NiO and 14% of molybdenum oxide MoO3, these compounds of active metals being deposited on an alumina. A commercial catalysyt of the PROCATALYSE company is also used. HYC 642 containing nickel and molybdenum oxides on a zeolite support.

Other hydrocracking catalysts on zeolite support such as HTY or S 5030 of the SHELL CHEMICAL company or even HC 14, HC 16 or HC 22 of the UNOCAL company (catalysts with a base of nickel and molybdenum oxides or nickel and tungsten oxides) have been used particularly.

EXAMPLE 1: (comparison)

In this example, a sulfurizing of the catalyst by operating according to the method of European Pat. No. EP-B-181254 is initiated in two stages:

First Stage

For the presulfurizing of the catalyst, TPS 37, manufactured by ELF AQUITAINE and containing about 37% by weight of sulfur, is used (the formula was given in the general part of this patent application); for the entire polysulfide to be absorbed, it is necessary to use a volume of reagent (polysulfide+solvent of the polysulfide) equal to the impregnation volume of the charge of the catalyst treated. Knowledge of this total porous volume, or impregnation volume, determines the amount of solvent to be used. In the context of the present test, this volume, for 100 g of the catalyst, is 45 ml on an average (including 60% solvent and 40% polysulfide). The solvent used is mineral spirits (boiling temperature between 150° and 250° C.).

A stoichiometric amount of sulfur is necessarily used subsequently to sulfurize the totality of the oxides (NiO, MoO3) or 7.1% S. The dry impregnation of the catalyst thus is initiated, followed by an evaporation under 10 mm of mercury (13 600 Pa) or under an inert gas stream.

Second Stage

1. First part of the second stage:
The catalyst is introduced in the reactor. The reactor is put under the pressure of a bar in the presence of air. (The same results would be obtained under a higher pressure, for example 60 bars). The catalyst is heated for 1 hour.

A Tc test performed at 150° C. is carried out.

The catalyst becomes black, with a deposit of water.

The SO2 in the gas effluents is measured with an infrared analyzer of COSMA trademark.

The sulfur content by weight, in the catalyst after the test, is the following:

% S=5.95

2. Second part of the second stage and hydrorefining tests:

The reactor is put under a hydrogen atmosphere, cold. The pressure is brought to 60 bars and the temperature to 150° C.

The hydrorefining tests are performed as follows: the injection of the charge to be converted is initiated and then the temperature is brought to 300° C. for an hour then to 350° C. for the test.

The results obtained are given in the table below

|   | Tc   | T'c  |
|---|------|------|
| A | 0.83 | 1.10 |
| I | 0.74 | 1.03 |

During the first part of the second stage, the operation also takes place not in the presence of air but with a mixture of 5% by volume of air, on one hand and 95% by volume of steam EXAMPLE 2 (according to the invention):

The operation is initiated as in example 1. However, the first stage is performed here in the presence of aniline.

1% by weight of nitrogen is used in relation to the organic polysulfide. As about 40 grams of polysulfide are used, an amount of aniline supplying 0.4 gram of nitrogen is used, i.e., since the molecular weight of aniline is 93 and the atomic weight of the nitrogen is 14:

$$\frac{93 \times 0.4}{14} = 2.66 \text{ grams of aniline (0.029 mole)}$$

This 2.66 grams of aniline is added in the mineral spirits which acts as a solvent for the organic polysulfide.

The results of the $T_1c$ test (corresponding to Tc in the comparison example) and the $T_1'c$ test (corresponding to T'c in the comparison example) are the following:

|   | $T_1c$ | $T_1'c$ |
|---|--------|---------|
| A | 0.81   | 1.16    |
| I | 0.62   | 1.07    |

These results show, on one hand, that the method according to the invention using a nitrogen compound is efficient when the first part of the second stage is performed in the presence of water but, on the other hand, that this same method is poor when the operation does not take place in the presence of nitrogen and even gives results slightly less than those obtained in EP-B-181254.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a process for regenerating a catalyst, said catalyst comprising:
    (a) a support containing at least one oxide of a metal or metalloid and
    (b) at least one Ni or Mo metal, said catalyst having been deactivated in a hydrocarbon refining reaction,
    said process comprising in a first stage treating said catalyst in the absence of hydrogen with at least one sulfurizing agent comprising a polysulfide of the formula $$R-S_{(n)}-R'$$

wherein n is 2 to 20, R is a hydrocarbon organic radical of 1–150 carbon atoms per molecule and R' is independently a radical as defined for R or a hydrocarbon atom, R and R' being selected from the group consisting of saturated or unsaturated, linear or branched alkyl radicals, naphthenic radicals, aryl radicals, alkylaryl radicals, and arylalkyl radicals, whereby said agent is incorporated at least in part in said catalyst,
    in a first portion of a second stage, treating the catalyst in the absence of hydrogen and in the presence of steam, moist air or moist inert gas, at a temperature up to 275° C., and, in a second portion of the second stage, treating the catalyst in the presence of hydrogen at a temperature of at least 275° C.
    the improvement comprising conducting the first stage in the presence of at least one arylamine compound capable of supplying ammonia to the regeneration, wherein the arylamine compound is added in an amount such that an amount of molecular nitrogen of about 0.1–10% by weight of the polysulfide is added.

2. A process of claim 1, wherein the first stage is performed ex situ.

3. A process of claim 1, wherein the first stage is performed at a temperature of about 0°–50° C.

4. A process of claim 1, wherein R and R' are each independently alkyl, aryl, alkaryl or aralkyl.

5. A process of claim 1, wherein the first portion of the second stage is conducted for at least about 5 minutes at about 65°–275° C. and at about 0.5–70 bar, and the second portion of the second stage is conducted for at least about 1 minute.

6. A process of claim 1, wherein before commencement of the second stage the catalyst is dried.

7. A process of claim 1, wherein the catalyst is dried between the first and second portions of the second stage.

8. A process of claim 1, wherein the first portion of the second stage is conducted in the presence of a moist inert gas or moist air with a relative humidity of 2 to 60 % by volume, and at a temperature of about 105° and 200° C.

9. A process of claim 1, wherein the temperature of the first portion of the second stage is between 110° and 170° C., and the first portion of the second stage is conducted for about 5 minutes to 10 hours.

10. A process of claim 1, wherein the first portion of the second stage is conducted for about 5 minutes to 10 hours, at a temperature lower than 200° C., in the presence of an inert moist gas whose water content is between 50 and 100%.

11. A process of claim 8, wherein during said second stage, moist air is used.

12. A process of claim 1, wherein in the second stage steam superheated to a temperature higher than 110° C. is used.

13. A process of claim 1, wherein the catalyst is subjected to an off-site regeneration.

14. A process of claim 1, wherein the arylamine compound is from the group consisting of monomethylaniline, dimethylaniline, aniline. diphenylamine or triphenylamine. arylamine compound is aniline.

15. A process according to claim 1, wherein the arylamine compound is aniline.

* * * * *